(12) United States Patent
Hwang

(10) Patent No.: US 9,407,102 B2
(45) Date of Patent: Aug. 2, 2016

(54) PORTABLE MODULAR POWER STATION

(71) Applicant: Charles Hwang, Gardena, CA (US)

(72) Inventor: Charles Hwang, Gardena, CA (US)

(73) Assignee: Charles Hwang, Claremont, CA (US)

( * ) Notice: Subject to any disclaimer, the term of this patent is extended or adjusted under 35 U.S.C. 154(b) by 464 days.

(21) Appl. No.: 14/088,149

(22) Filed: Nov. 22, 2013

(65) Prior Publication Data

US 2015/0091392 A1   Apr. 2, 2015

Related U.S. Application Data

(60) Provisional application No. 61/883,615, filed on Sep. 27, 2013.

(51) Int. Cl.
*H02J 7/00* (2006.01)

(52) U.S. Cl.
CPC .................................. *H02J 7/0045* (2013.01)

(58) Field of Classification Search
CPC ...... Y02E 60/12; H02M 3/18; H01M 2/1022; H01M 2220/30; H02J 17/00; H02J 5/005; H02J 7/025; H02J 3/01; H01F 38/14; H01F 27/006; B60L 11/182; B60L 11/1829; B60L 11/1831; B60L 5/005; Y02T 90/122; H04B 5/0037
See application file for complete search history.

(56) References Cited

U.S. PATENT DOCUMENTS

| 5,982,138 A * | 11/1999 | Krieger | ................. H02J 7/0065 320/104 |
| 2013/0099738 A1* | 4/2013 | Brockman | .............. F02N 11/12 320/109 |

* cited by examiner

*Primary Examiner* — Kenneth B Wells
*Assistant Examiner* — Rafael Pacheco
(74) *Attorney, Agent, or Firm* — International Property Venture Group; Robert E. Roberts

(57) ABSTRACT

A portable power station including a current, light, and voltage sources as well as a control panel to permit a user to selectively operate the current and light sources. A housing contains the sources and is suitable to contain a main power source that has positionally fixed and polarized power terminals. The housing includes positionally fixed attachment posts to which the polarized conductors of the sources are electrically connected, and which are suitable for electrical connection of the polarized power terminals of the main power source.

19 Claims, 11 Drawing Sheets

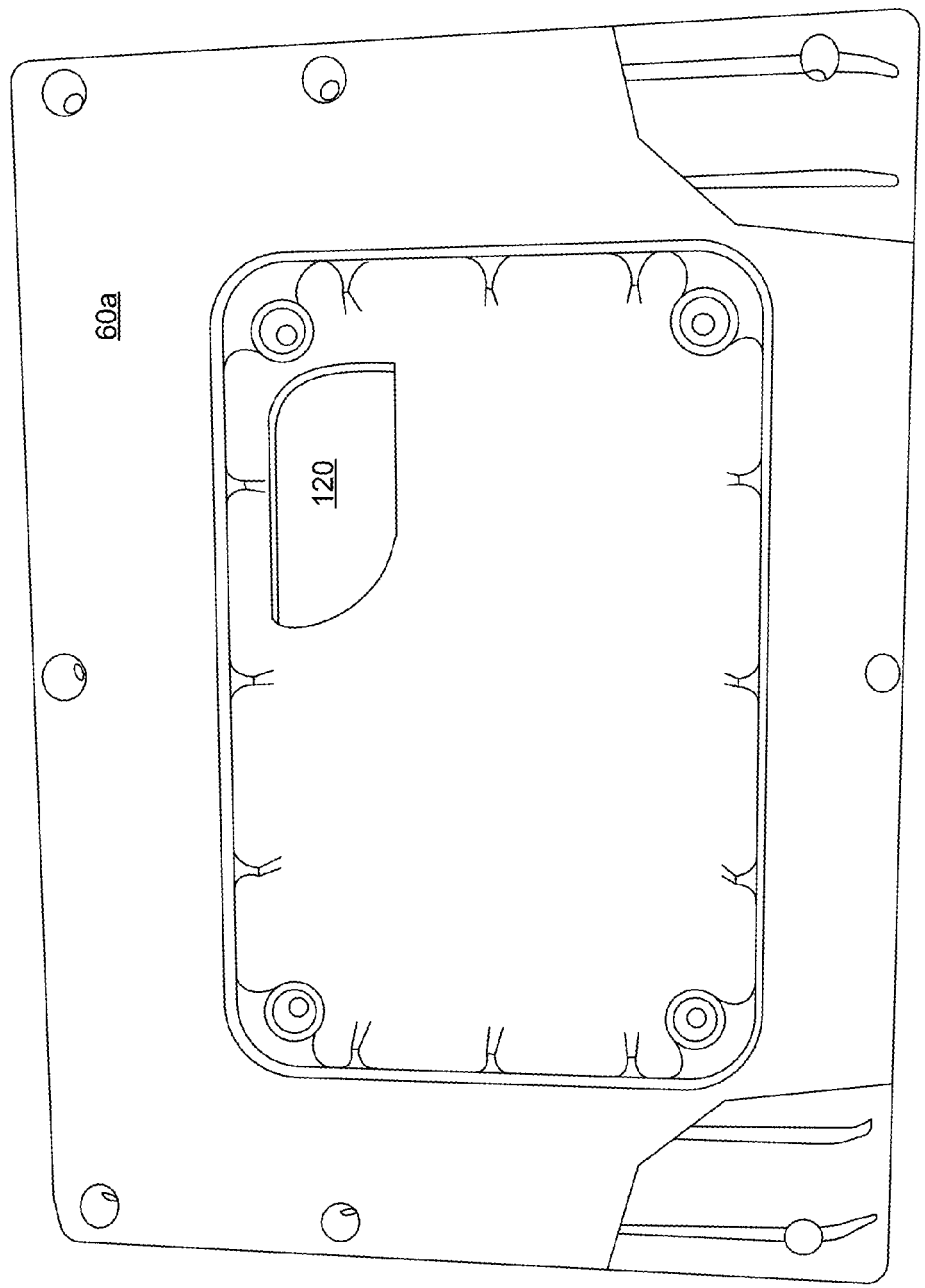

PORTABLE MODULAR POWER STATION

CROSS-REFERENCE TO RELATED APPLICATIONS

This application claims the benefit of U.S. Provisional Application No. 61/883,615, filed Sep. 27, 2013, hereby incorporated by reference in its entirety.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

COPYRIGHT NOTICE AND PERMISSION

This document contains some material which is subject to copyright protection. The copyright owner has no objection to the reproduction with proper attribution of authorship and ownership and without alteration by anyone of this material as it appears in the files or records of the Patent and Trademark Office, but otherwise reserves all rights whatsoever.

BACKGROUND OF THE INVENTION

1. Technical Field

The present invention relates generally to methods and apparatus for controlled or regulated charging, discharging, or combined charging and discharging of power sources, such as batteries, and more particularly to where an internal such power source charges or operates an external second power source.

2. Background Art

In some manner, we have had electrical power stations nearly as long as we have had electrical power sources. Of present interest are electrical power stations that followed the addition of electrical starting and other electrical accessories in motor vehicles. Such power stations typically have had to meet the electrical requirements of their end application as well as be nominally portable to often be transported to such applications. For instance, a common application is to start an automobile where the owner has left the headlights on depleted the vehicle's battery. A power station suitable for this application must provide 12 volt direct current at sufficient amperes to operate the starter of the vehicle (typically while the vehicle's battery is still connected and presents an additional load as it recharges). Such a power station also usually must be portable to wherever a vehicle's owner parked when they left the headlights, typically a parking lot at their place of employment or at a store or restaurant.

The simplest power station for such an application is another vehicle that has a powerful enough battery, and a set of jumper cables. This simple solution, however, is not one that automotive and other service professionals are comfortable with. For example, a small service vehicle used to service large trucks in the field may not inherently come with or even be fit able with a large enough battery. Moreover, even when this can be done it is inefficient, in the small service vehicle when it is used for other tasks, and it is risky. Batteries become "weak" over time and use, and an aged or heavily used battery that starts a small service vehicle may embarrassingly not still be strong enough in a service application.

Most service professionals tend to prefer stand alone power stations. Historically, continuing mostly with automotive service scenarios but obviously extendable to aviation, nautical, and many other applications as well, a service profession would build or buy a power station with a large battery in an at least semi-portable housing, the a set of heavy cables terminated with suitable clams. In auto service stations one will frequently see such a power station today. It usually has two wheels, to permit easy limited movement, and it can be lifted into a service vehicle for field service calls.

Our society has increasingly come to rely on electrical power, and especially direct current power. Let us consider a few examples. Automobiles are now ubiquitous in some places, but so are cellular telephones and laptop computers. In fact many of us routinely use chargers for these devices that attach to a 12 volt DC power source in our automobiles. Many emergency and other specialty radios today can additionally be or are exclusively are powered with 12 VDC. Some televisions, small air compressors, lighting systems, and heating systems similarly can use 12 VDC. Ironically, an increasingly common electronic device today is power inverters, to convert 12 VDC to 120 or 240 volts, 60 cycle alternating current (AC) power.

Increasingly, people who are not service professionals, as well as ones who are but who want an appliance for personal use, are interested in power stations. These prospective new users want more than an expensive and awkward to handle box. They are willing to compromise on power to get economy, portability, and safety. Unlike service professionals, users here typically need a solution that can be stored between infrequent uses, that can be reliable when needed, and that is safe and easy. Thus, unlike professional service scenarios where lead technology batteries with their attendant their flammable hydrogen fumes, corrosive sulfuric acid, and expensive and environmentally threatening disadvantages may be manageable, a potential user here prefers a non lead-based power source or at least a very reliably sealed and storage-life optimized lead-based power source.

Moreover, these users typically have specific applications in mind and they want a power station that as flexibly as possible fulfills those applications as well as others that they may later encounter. These prospective new users often want sophistication in a power station. Many would like an air compressor and/or a power inverter integrated into a power station, but commercial offerings of such are not common.

Often unappreciated until needed, many such users (as well as many service professionals) would like a power station that provides lighting. There are only two basic ways hook two power sources, such as an automobile battery and a power station. When one cannot see what they are doing they will get it wrong 50% of the time, with great risk to safety and equipment. Service professionals appreciate this an strive to get it right, by also have a separate light source and using it (e.g., having an assistant hold a flash light, even if they have to wait for or go ask an assistant to do this). Lay users are not always so prepared in advance, or so patient, or will have read a power station's safety and usage instructions.

Accordingly, there is a growing market for economical power stations, but this market is not currently well served. Those who have tried to serve this market have tended to not study to scope of the market, and thus have tried to serve this market with offerings that retailers and end users find lacking.

Having mentioned retailers for the first time, let us consider their concerns. When a retailer has an adult in a suite or any adolescent buy a set of jumper cables the retailer cringes. In exchange for a relatively small profit, the retailer is taking a serious risk of litigation. Does an adult man or woman in a suit know how to work with lead-acid technology? For that matter does an adult in overalls know this? Has an adolescent enough life experience that a personal injury jury would find it reasonable to sell them jumper cables? Is such a retailer now willing to also stock and sell economical power stations? Clearly, such power stations must be as inherently safe and intuitively usable as possible.

Current economical-grade power stations offerings are jumper cables, already discussed at length; trickle chargers; and secondary battery-in-a-boxes. A trickle charger, in this context, is an AC powered battery charger. Its portability is limited to the length of extension cords that one can use to connect it to an AC power source. In general, trickle chargers put out such a small current (a "trickle) that connecting them incorrectly is relatively safe and at most damages the application or the trickle charger itself.

In contrast, a secondary battery-in-a-box is kludge, usually a minimalist make do solution. A battery-in-a-box is distinguishable from a professional-grade stand alone power station, and from the about to be disclosed invention, in that these other solutions are optimized for suitability for their anticipated users and their particular end applications. As the label "battery-in-a-box" implies, this usually consists of a box, often an ice chest or a container that markedly resembles one; a battery, very often a standard automotive lead-acid battery; and a set of cable clamps.

The ice-chest rebalance of battery-in-a-box devices can perhaps be attributed to a desire to evoke similar convenience in the minds of potential buyers. This is unfortunate, since a potential buyers should instead be considering if the device has drainage, if sulfuric acid exits the power source, or ventilation if hydrogen gas exits the power source. Potential purchasers of a battery-in-a-box are frequently enticed by claims of high power output and fast recharge ability, with these claims achieved by not "going cheap" on the standard automotive lead-acid battery and the charger used. This exacerbates sulfuric acid and hydrogen gas risks. Bigger battery-in-a-box devices often have wheels in the same manner as larger ice chests. Where manufactures of battery-in-a-box devices do sometimes do go cheap is on cable clamps. Copper is relatively expensive, hence savings can be had by using less of it. This can be done by using smaller gage wire in cables, providing shorter cables, and using little copper and more plastic in clamps.

Typically, battery-in-a-box devices are only a high current or ampere-hours solution, but the present inventor has recently observed one exception. Recently a Chinese-manufactured battery-in-a-box device has appeared in some U.S. automotive accessory stores that includes a 120/240 VAC power inverter.

BRIEF SUMMARY OF THE INVENTION

Accordingly, it is an object of the present invention to provide a improved power station.

Briefly, a preferred embodiment of the present invention is an a power station suitable for portable use by a human user. Included is a current source, a light source, and a voltage source each having positive and negative polarity conductors. Further included is a control panel including controls to permit the user to selectively operate the current and light sources. A housing contains the sources and control panel, and is suitable to contain a main power source that has positionally fixed positive and negative power terminals. The housing has positionally fixed attachment posts to which the polarized conductors of the sources are electrically connected, and which is also suitable for electrical connection of the positive and negative power terminals of the main power source.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE SEVERAL VIEWS OF THE DRAWING(S)

The purposes and advantages of the present invention will be apparent from the following detailed description in conjunction with the appended figures of drawings in which.

Figure 6:
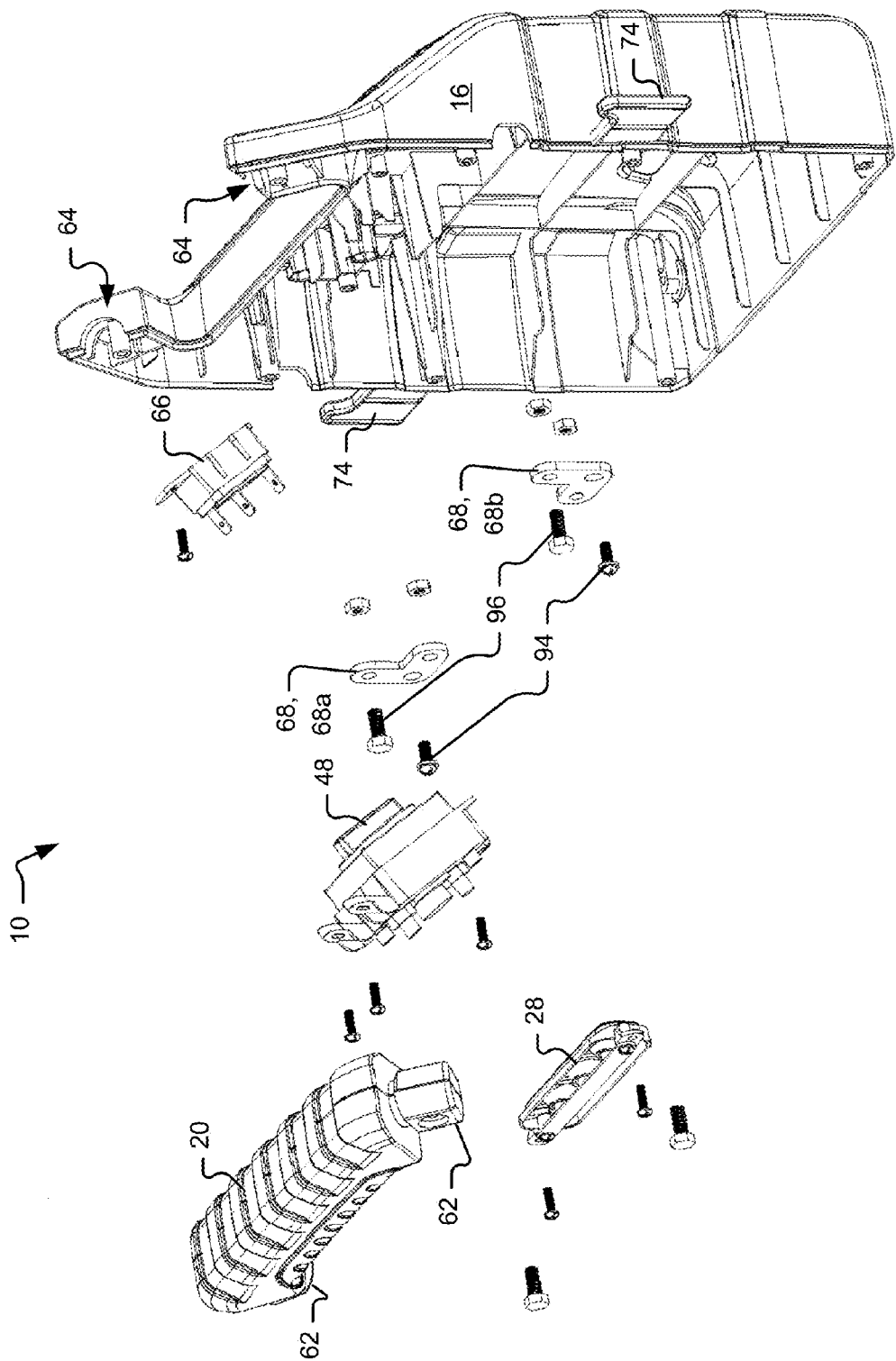

FIG. 6 also shows the back of the power station with some of the components of the control panel and the lighting panel being installed.

Figure 7:
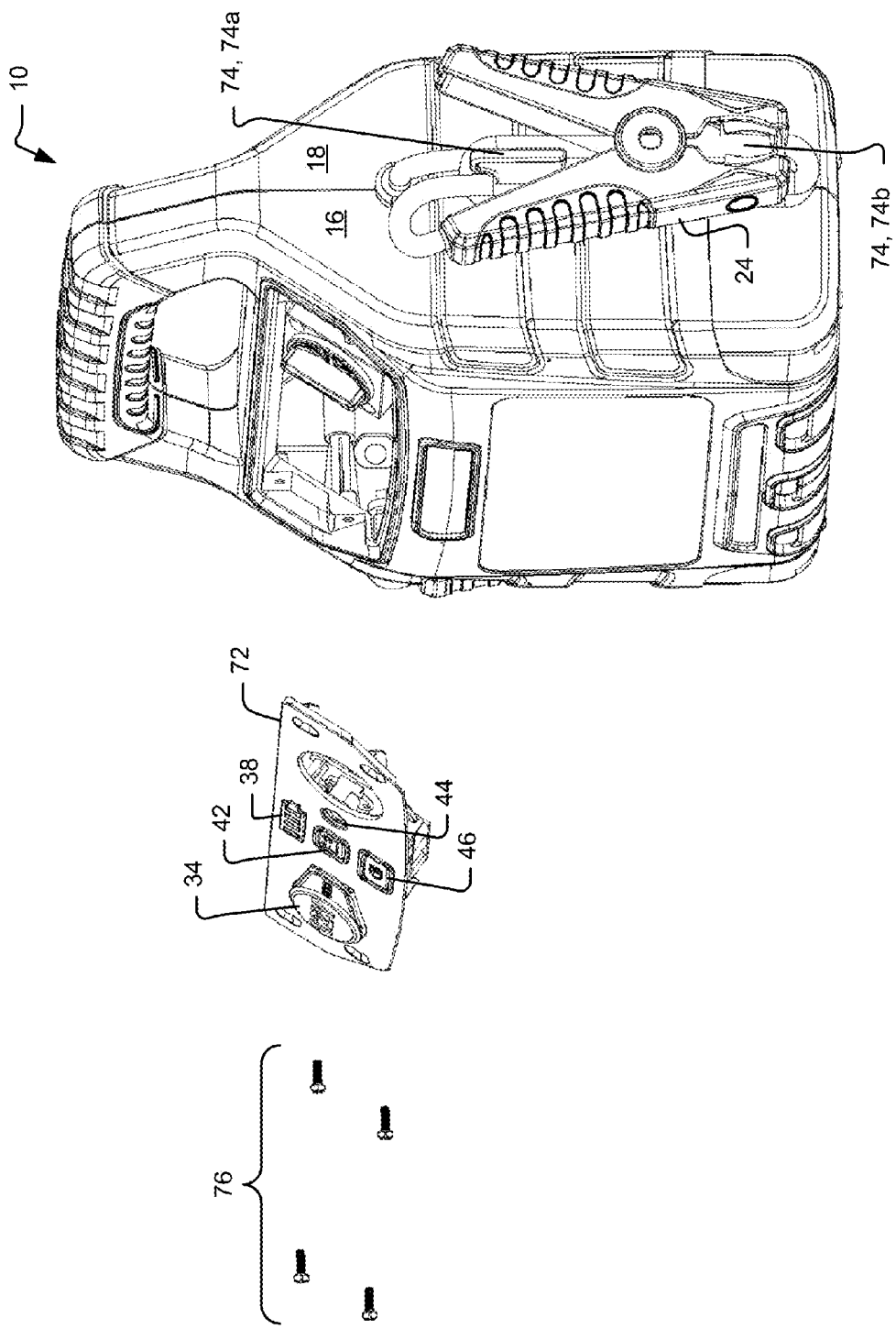

FIG. 7 shows the front of the power station with the rest of the control panel being installed.

Figure 8:
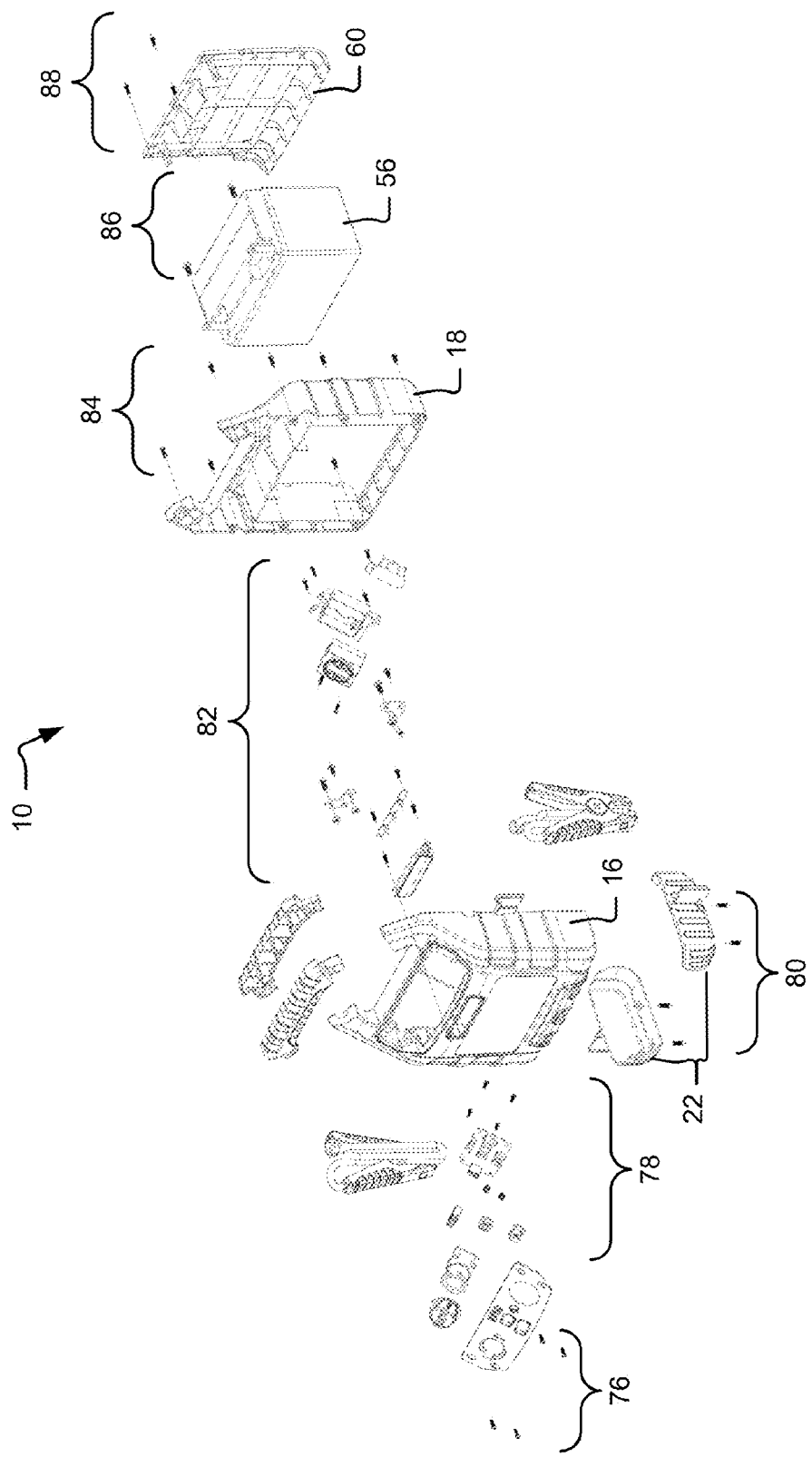

FIG. 8 is an exploded view of the entire power station.

Figure 2:
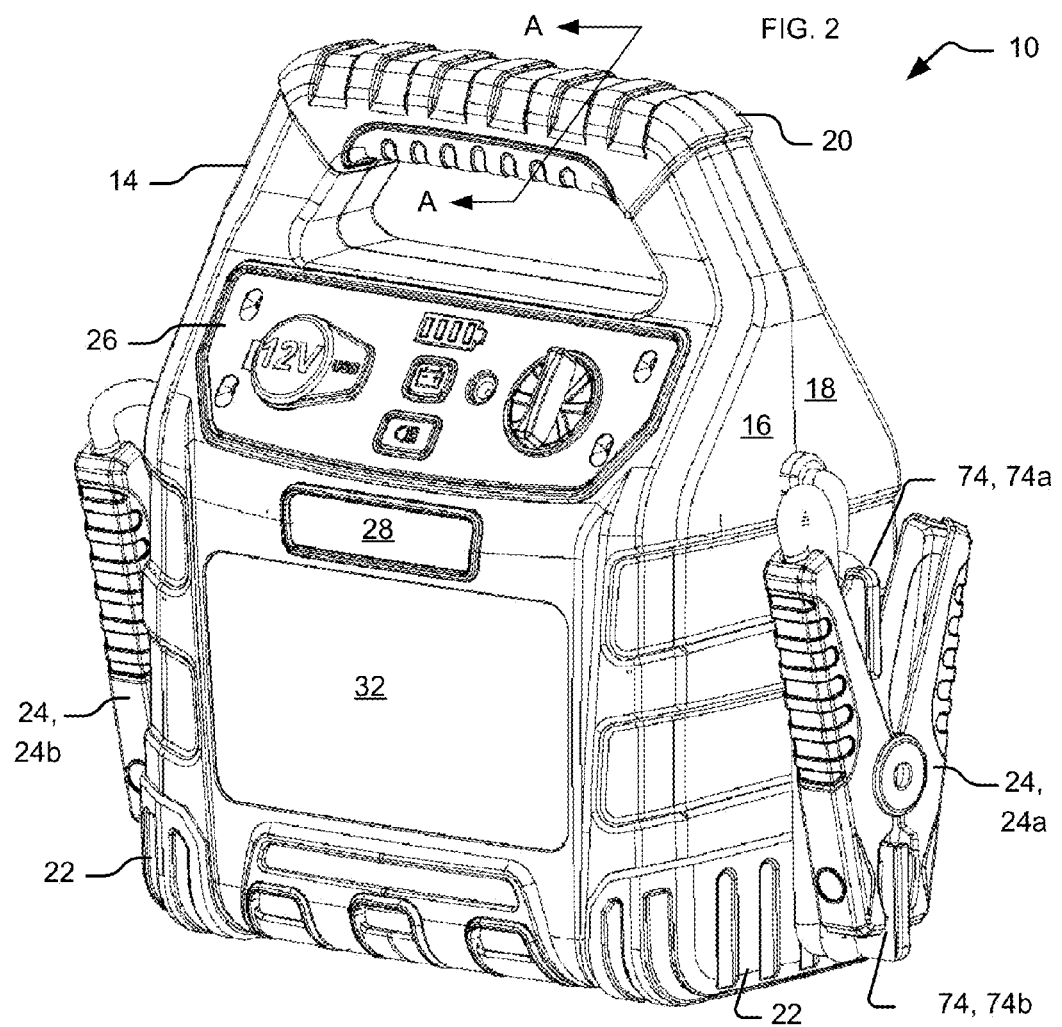
FIG. 2 is a perspective view of an exemplary power station in accord with the present invention.
Figure 9:
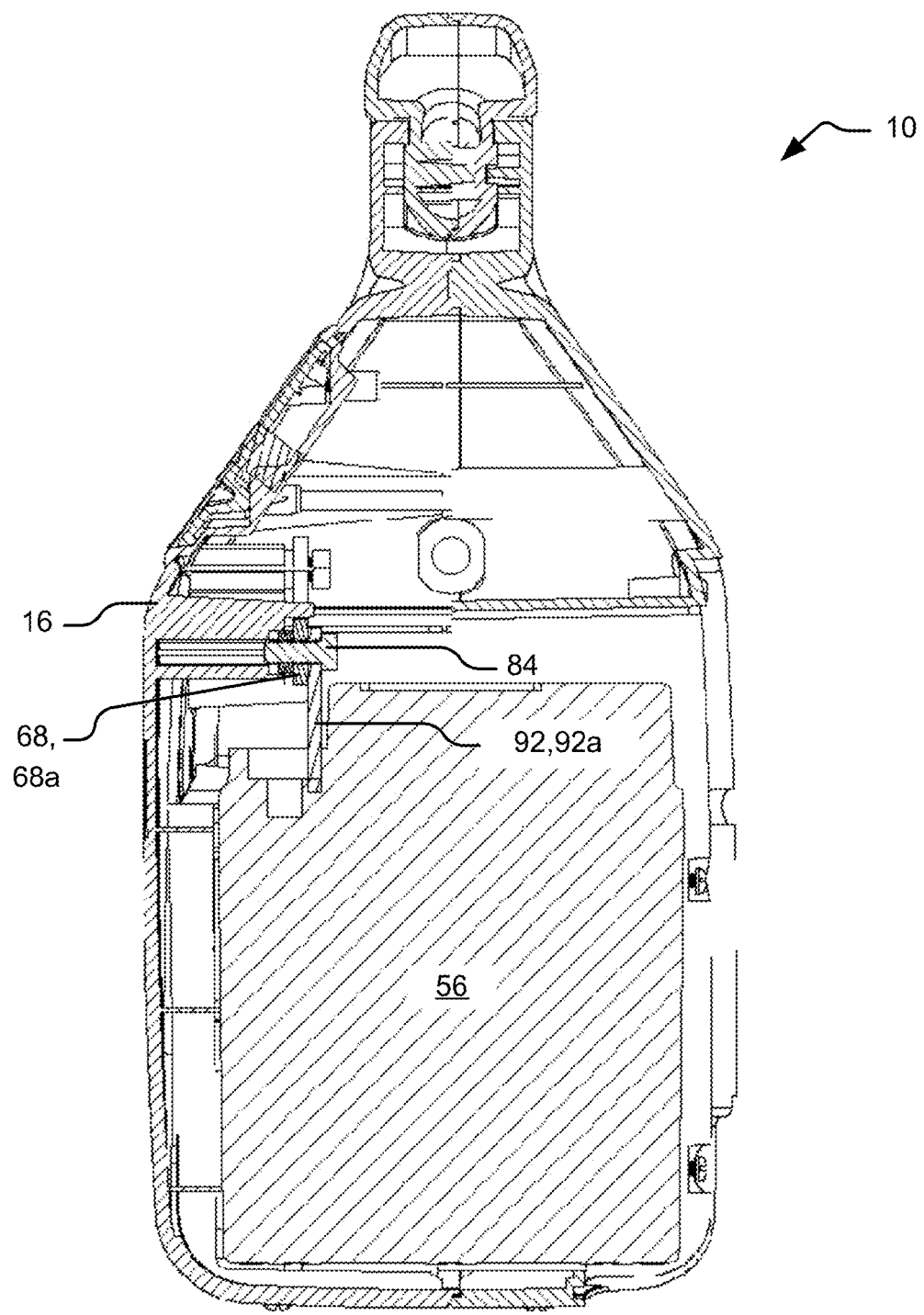

FIG. 9 is a cross-section view along section A-A in FIG. 2.

Figure 10A:
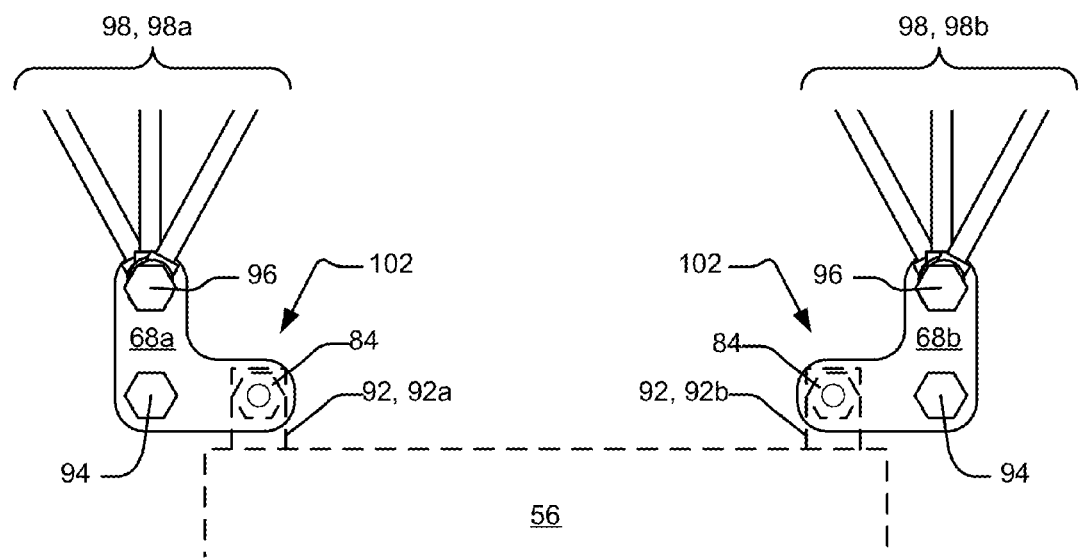
Figure 10B:
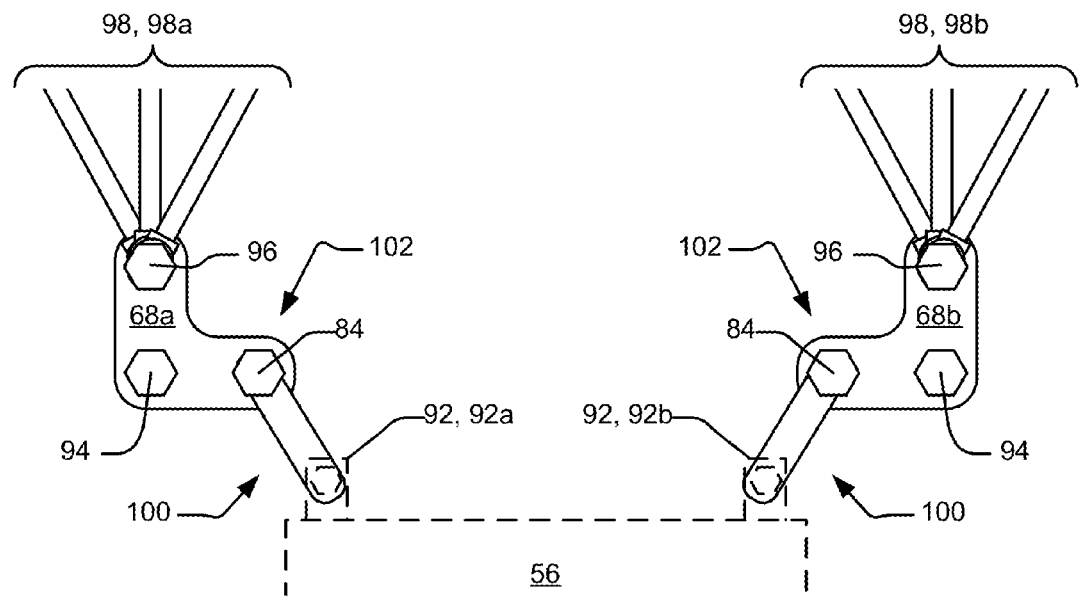

FIGS. 10a-b are schematic views showing how the same attachment posts can receive two alternated sizes of the main power source of the power station.

Figure 11A:
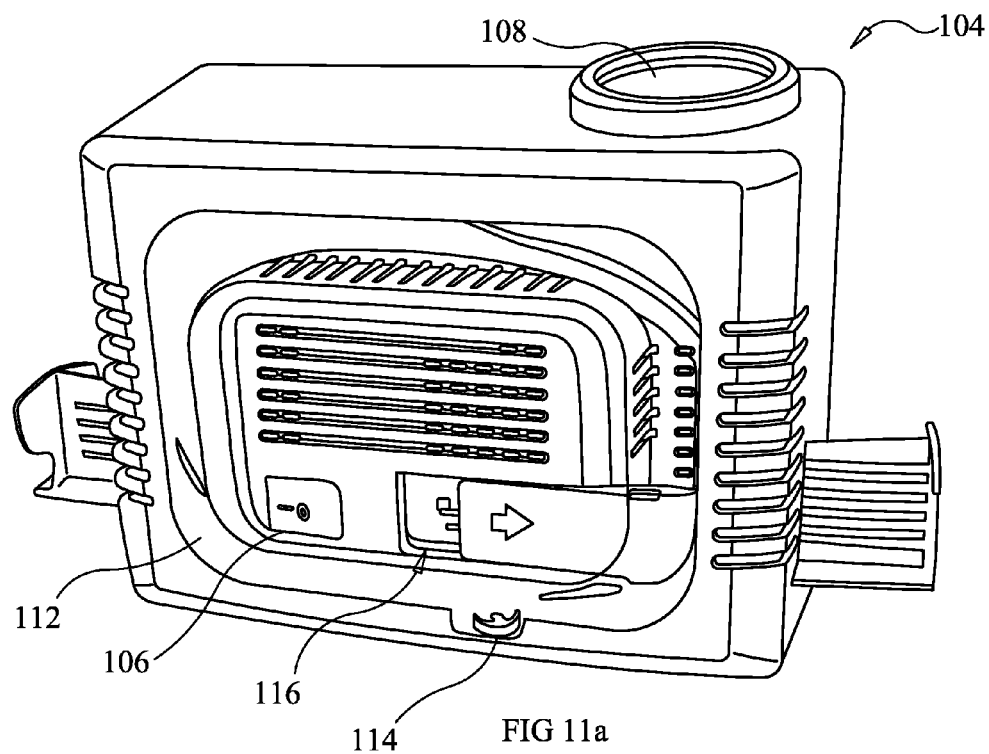
Figure 11B:
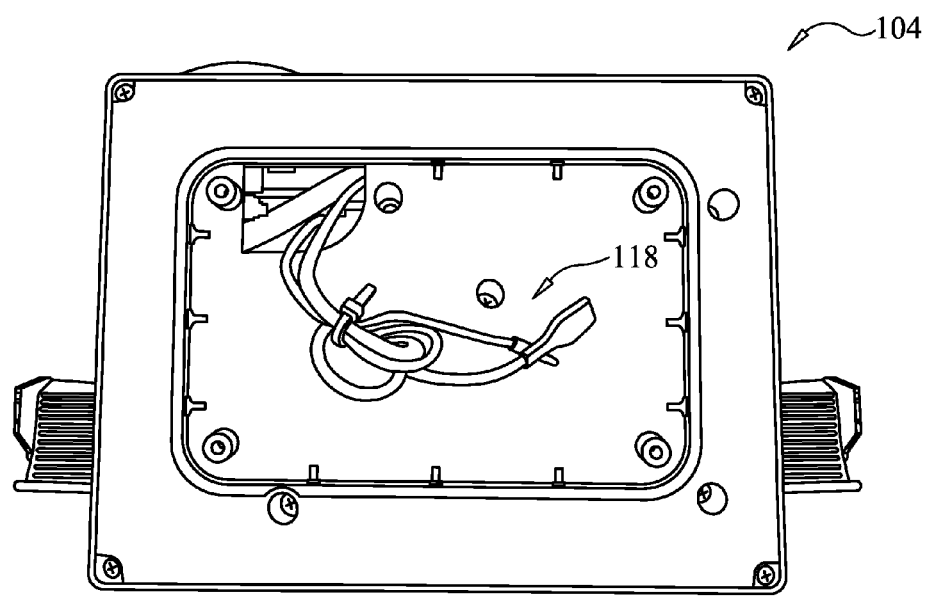

FIGS. 11a-b are front and rear views, respectively, of an option module for use with the power station, here an air compressor module.

FIG. 12 shows how option modules are connected to the power station, in essence, being "piggy-backed" onto the back shell piece of the housing.

Figure 13:
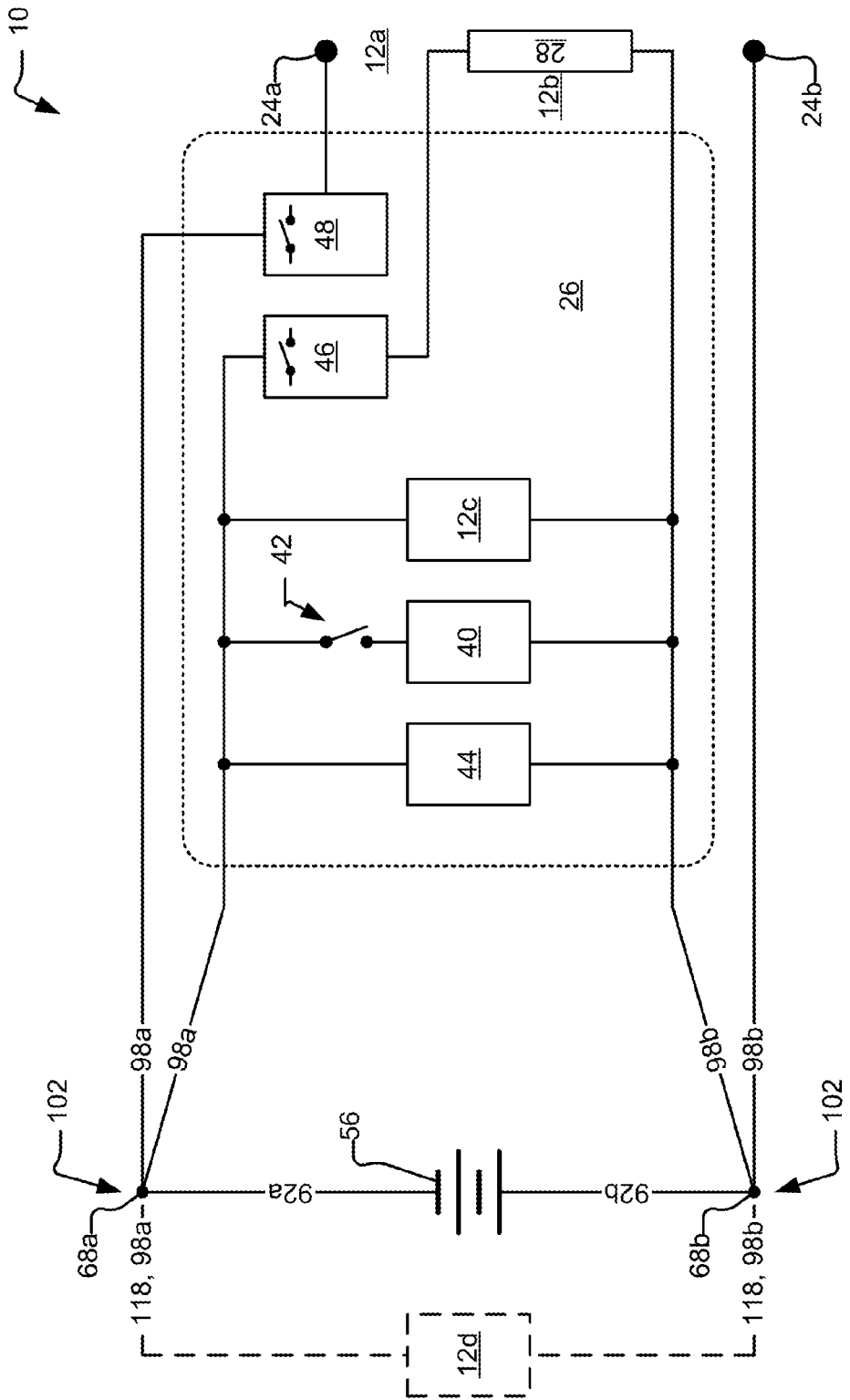

FIG. 13 is a stylized and basic schematic diagram of an electrical diagram for circuitry suitable for use in the inventive power station.

In the various figures of the drawings, like references are used to denote like or similar elements or steps.

DETAILED DESCRIPTION OF THE INVENTION

A preferred embodiment of the present invention is a portable modular power station. As illustrated in the various drawings herein, and particularly in the views of FIGS. 1-2, wherein an embodiment of the invention is depicted by the general reference character 10.

The present invention is termed a "portable modular power station" because it is portable (i.e., it can be easily moved about by a human adult) modularly assembled, yet provides a set of functions (functions 12 collectively and functions 12a-d individually) that traditionally are found only in a stationary setting. For instance, the power station 10 may provide a heavy current sourcing function 12a, a light sourcing function 12b, an external device voltage sourcing function 12c, and an optional module source function 12d.

The current sourcing function 12a of the power station 10 may particularly be used for jump starting vehicles and charging batteries, as well as for many other tasks that require high amperage direct current or high ampere-hours power. For instance, the power station 10 might be used to power heating cables wrapped around water pipes in a home during a cold spell or to power radio communications equipment in an emergency situation.

The light sourcing function 12b of the power station 10 may be used for illumination and signaling. For instance, a very common problem when jump starting a vehicle is lack of illumination to correctly and safely connect jumper cables to the vehicle battery. Light as a signal can take many forms. Thus, for example, a user could set the power station 10 where it can be seen, say, to warn passing motorists to be cautious when driving by. Or a user could waive the power station 10 from side to side to both draw attention and to imply a safe direction for passing motorists to taken when driving by. Due to the already discussed high ampere-hours capability, the power station 10 can provide light for at least some hours.

The voltage sourcing function 12c of the power station 10 include sourcing 12 VDC at a conventional automotive type accessory female plug (sometimes called a cigarette lighter plug) and sourcing 5 VDC at a conventional USB type-A female plug. The range of external devices that can be powered by or recharged from these two types of plugs and voltages is huge, including medium power devices like marine-band radios and low power devices like cellular telephones.

Finally, the module source function 12d of the power station 10 can include any option that can use 12 VDC and for which there is a need. One embodiment described below includes an air compressor function. This permits inflating vehicle tires to their correct pressure, the repair of flats, inflating of inflatable boats, toys, etc. This can also be used as a source of compressed air for typical "shop uses," such as blowing away dust, flushing sludge out of narrow hoses, etc. Another optional module for the power station 10 that the inventor is presently working on is a power inverter function, to convert 12 VDC to 120/240 VAC.

Figure 1:
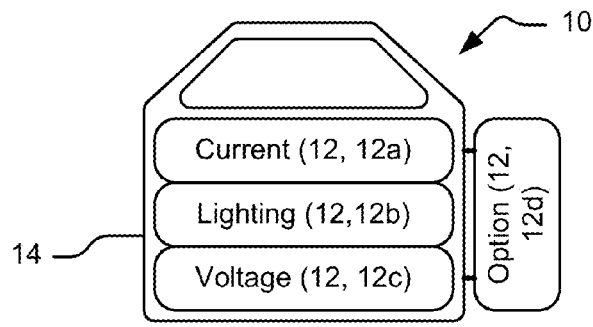
FIG. 1 is a schematic block diagram depicting how the functions of the portable modular power station are integrated together.

FIG. 1 is a schematic block diagram depicting how the functions 12 of the power station 10 are integrated together. The current sourcing function 12a, light sourcing function 12b, and voltage sourcing function 12c are literally integrated within a housing 14, whereas the optional module source function 12d, when present, is physically attached to the exterior of the housing 14.

FIG. 2 is a perspective view of an exemplary power station 10 in accord with the present invention. This power station 10 does not include an optional module source function, although one might be added. The major physical feature of the power station 10 is the housing 14, that, in turn, has a front shell piece 16, a back shell piece 18, a handle unit 20, and two base units 22. The power station 10 here also has two large cable clamps 24 (a positive clamp 24a and a negative clamp 24b) which are used in straightforward manner for the heavy current or power sourcing function.

As can also be seen in FIG. 2, the front shell piece 16 of the housing 14 here includes a control panel 26, a lighting panel 28, and a face panel 32. The control panel 26 permits a user of the power station 10 to controllably employ its features and to receive feedback about those features. The lighting panel 28 provides the lighting functionality of the power station 10, and is controlled by the control panel 26. The face panel 32 is a location where information about the power station 10 is typically put.

Figure 3:
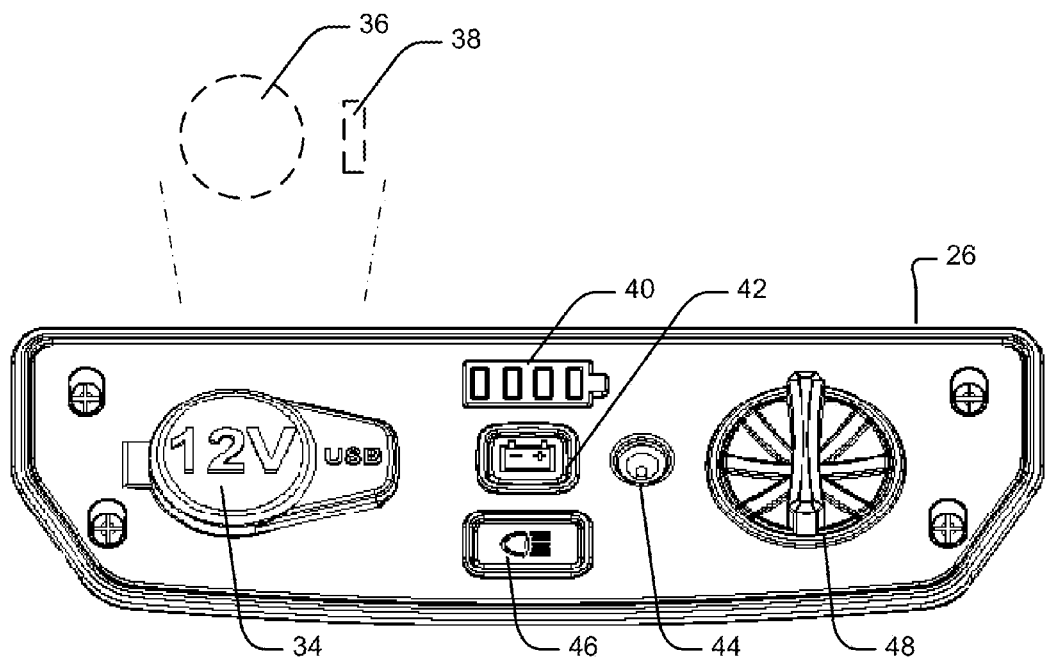
FIG. 3 shows the control panel of the power station in FIG. 2.

FIG. 3 shows the control panel 26 of the power station 10 in FIG. 2. A rubber-like flip-up door 34 is provided to protect both an underlying automotive accessory plug 36 (a female plug able to source 12 VDC) and an underlying USB type-A plug 38 (a female plug able to source 5 VDC). A charge gauge 40 is provided to indicate the state of charge of the main power source inside the power station 10. In the embodiment here the charge gauge 40 includes multiple light emitting diodes (LEDs) that are red, yellow, and two shades of green. Pressing a charge check button 42 completes a circuit with the charge gauge 40 and the main power source, permitting the LEDs to graphically and colorfully indicate the state of charge. A charging port 44 is provided to permit connection of an external charging unit (not shown) that can charge some versions of the main power source in straightforward manner. A lighting button 46 is provided to control the lighting panel 28, discussed presently. And a main power switch 48 is provided to control connection of the terminals of the main power source to the cable clamps 24.

Figure 4:
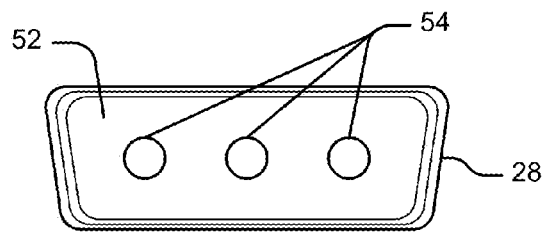
FIG. 4 shows the lighting panel of the power station in FIG. 2.

FIG. 4 shows the lighting panel 28 of the power station 10 in FIG. 2. Included here is a clear lens 52 that covers white-light LEDs 54 (three LEDs is preferred, but that quantity is not a limitation). Simple embodiments of the power station 10 can have the lighting button 46 permit toggling the white-light LEDs 54 on and off. More sophisticated embodiments can have the lighting button 46 permit cycling through the white-light LEDs 54 in various other useful manners.

Figure 5:
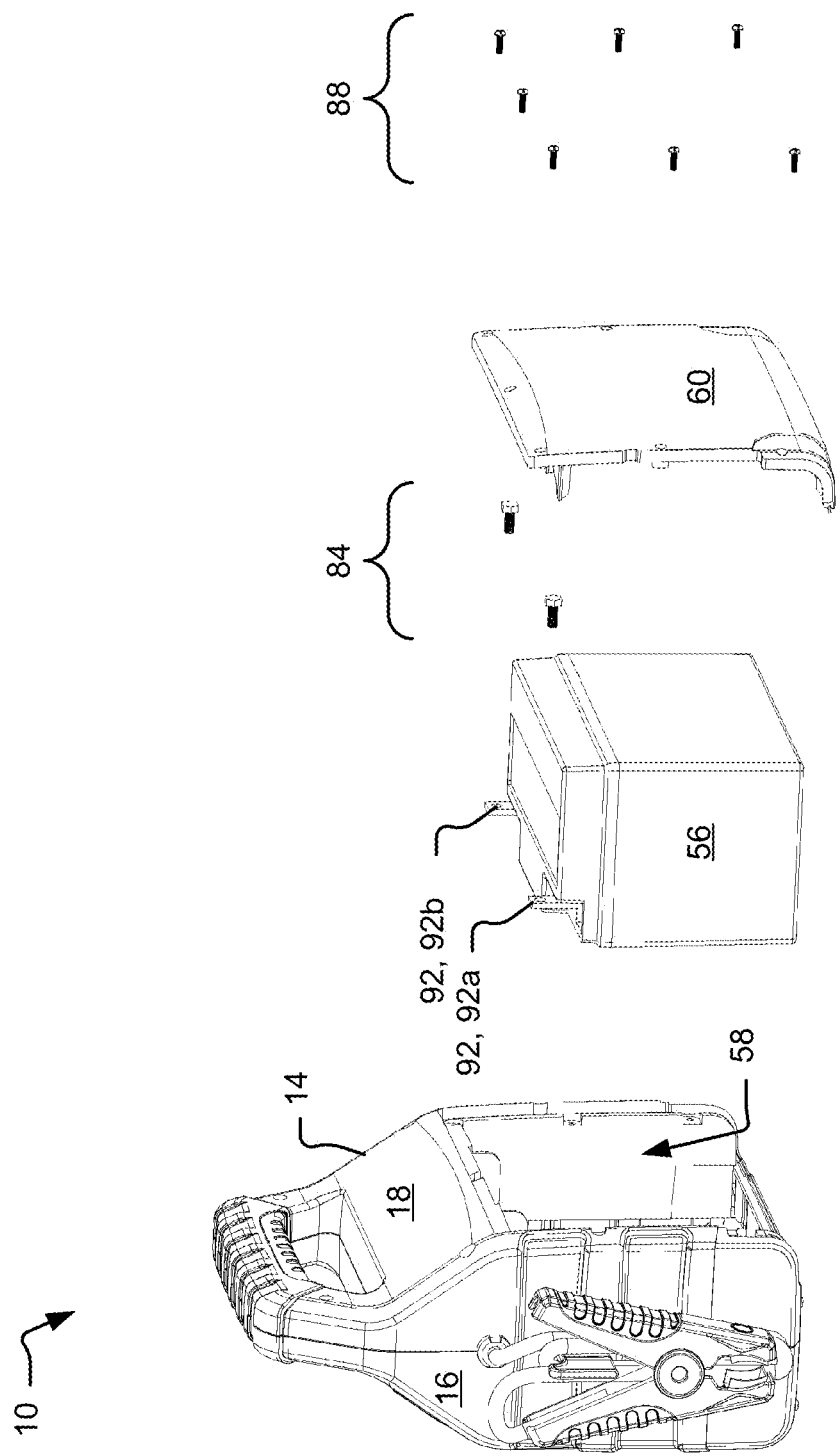
FIG. 5 shows the back of the power station with the main power source being installed.

FIG. 5 shows the back of the power station 10 with a main power source 56 being installed. As can be seen, the main power source 56 is contained fully in a compartment 58 in the back shell piece 18 of the housing 14, behind a compartment door 60. A subtle but very beneficial aspect of the power station 10 that can be appreciated here is that the main power source 56 is installed nearly last, after all of the other functional elements have been installed. Thus, all of the controls will have been installed into or inside of the housing 14 and the front shell piece 16 and the back shell piece 18 will have been assembled together before the main power source 56 is installed. This permits easy, modular, flexible, and robust assembly to be particular benefits of the power station 10. A more detailed discussion of these benefits and the main power source 56 are provided, below.

FIG. 6 shows the back of the power station 10 with the handle unit 20 being installed. The handle unit 20 has end blocks 62 that engage with corresponding end openings 64 in the top of the front shell piece 16. In a later assembly stage than shown in FIG. 6 (see e.g., FIG. 8), the back shell piece 18 which has similar end openings is added, thus capturing the end blocks 62. When screws are inserted to attach the back shell piece 18 to the front shell piece 16 two such screws pass through the back shell piece 18, into the end openings there, through the end blocks 62 of the handle unit 20, into the end openings 64 of the front shell piece 16, and part way into the front shell piece 16. This particularly clamps the handle unit 20 securely in the finally assembled power station 10.

FIG. 6 also shows the back of the power station 10 with some of the components of the control panel 26 and the lighting panel 28 being installed. The automotive accessory plug 36 and the USB type-A plug 38 are part of a device plug block 66 that is installed as a unit. Similarly, the main power switch 48 is installed as a unit. In alternate embodiments, the entire control panel 26 can be installed as a single pre-assembled a module. Two attachment posts 68 (a positive post 68a and a negative post 68b) are also shown being installed here, and are discussed in more detail presently. Finally, the lighting panel 28 is installed here as a module.

FIG. 7 shows the front of the power station 10 with the rest of the control panel 26 being installed. Specifically, a cover plate block 72 is installed that will cover the device plug block 66 and the main power switch 48. This cover plate block 72 also includes the flip-up door 34, charge gauge 40, charge check button 42, charging port 44, and lighting button 46.

FIG. 8 is an exploded view of the entire power station 10. In addition to providing a summary of aspects already discussed, the view here particularly helps to see some overall features of the power station 10. For example, here it can be seen how the base units 22 engage over both the front shell piece 16 and the back shell piece 18, to clamp and hold these together and thus make the overall housing 14 of the power station 10 much more robust. Returning briefly also to FIG. 7, it can be seen that the front shell piece 16 has two wing pieces 74 (top wings 74a) and that the base units 22 each also have two wing pieces 74 (bottom wings 74b). When the power station 10 is not in use the cable clamps 24 each can have the cable portion wrapped around the wing pieces 74 and the clamp portion clamped onto a respective wing piece 74, as shown (see also, FIGS. 2, 5).

Continuing with FIG. 8, the use of screws in the final assembly of the power station 10 should be noted. Proceeding left to right, a first final screw set 76 comprises screws that attach the cover plate block 72. A block screw set 78 comprises screws that assemble the cover plate block 72, but at final assembly these are already installed as part of the cover plate block 72. A third final screw set 80 comprises screws that attach the base units 22 to the front shell piece 16 and the back shell piece 18 of the housing 14. Next to the right is a components screw set 82 that comprises screws that assemble components to the front shell piece 16 (for instance, the main power switch 48). At final assembly these are also already installed. A terminal screw set 84 comprises two screws, discussed in detail presently. A second final screw set 86 comprises screws to attach the back shell piece 18 to the front shell piece 16. And a fourth final screw set 88 comprises screws to attach the compartment door 60 to the back shell piece 18.

The block screw set 78 and the components screw set 82 will already be installed prior to final assembly. The first final screw set 76 will therefore typically be the first set of screws installed during final assembly. Then the back shell piece 18 and the front shell piece 16 are mated together and the second final screw set 86 is installed. The base units 22 are installed with the third final screw set 80. Now, or at some later time, the main power source 56 is installed, with the terminal screw set 84. And the compartment door 60 is mated with the back shell piece 18 and the fourth final screw set 88 is installed.

Next consider the orientation of the screws during assembly. The first final screw set 76 ultimately is at a downward angle relative to the power station 10 when finished, but during assembly the front shell piece 16 can simply be rotated as desired to facilitate installing the first final screw set 76. Installing the block screw set 78 is even easier, since the cover plate block 72 can be rotated to face down and direct vertical and downward installation of the block screw set 78 can be used. The same manner of rotation to face down and direct vertical and downward installation of the components screw set 82, terminal screw set 84, second final screw set 86, and fourth final screw set 88 can be employed. The installation of the third final screw set 80 (for the base units 22) then requires horizontal installation or another rotation.

FIG. 9 is a cross-section view along section A-A in FIG. 2. Here a major safety feature of the power station 10 can be observed (see also, FIG. 5). The main power source 56 cannot be incorrectly installed (e.g., with the electrical polarity reversed). The main power source 56 has two power terminals 92 (a positive terminal 92a and a negative terminal 92b) that are fixed in position. In particular, the terminals 92a-b are much closer to the "front" of the main power source 56. Inside the front shell piece 16 the attachment posts 68 are fixedly mounted in positions able to connect to the terminals 92a-b only when they are close. Thus, for instance, putting the main power source 56 in "backwards" will result in the terminals 92a-b being displaced away from and not being connectable with the attachment posts 68. This is a substantial safety improvement over other systems that employ high-power automotive type batteries that can be incorrectly installed or incorrectly connected, e.g., due to the use of movable cables for connection.

FIGS. 10a-b are schematic views showing how the same attachment posts 68 can receive two alternated sizes of the main power source 56 (shown in ghost outline). FIGS. 10a-b show the same attachment posts 68, and how they are mounted inside the front shell piece 16 (FIG. 6) with mounting screws 94 holding them in place. The attachment posts 68 here are L-shaped brackets. Other shaped brackets may alternately be used, of course. For example, brackets that are L-shaped or angular in one plane but have a z-offset in another plane. The point in labeling these "posts" is to invoke a point like image of electrical connection points, one where positive electrical connection occurs and one where negative connection occurs. The attachment posts 68 each have wiring screws 96 that receive respective wires 98, positive polarity wires 98a to the positive post 68a and negative polarity wires 98b to the negative post 68b. In keeping with the goal of modularity in the power station 10, an effective minimum of wires 98 are employed (as described in more detail presently). The back shell piece 18 has openings that provide access from the compartment 58 to the attachment posts 68, thus permitting connection of a main power source 56 to the attachment posts 68 with the terminal screw set 84.

Continuing with the attachment posts 68, the ones shown in the figures herein are nominally "L-shaped," that is, they have the positions for the wiring screws 96 and the connection points 102 closer together rather than at opposed ends of I-shaped attachment posts 68. This is not a requirement, for example, the attachment posts 68 could be straight (e.g., I-shaped or have another shape), but this L-shape permits an overall more compact construction of the power station 10, as well as more subtle benefits like minimizing the areas of the openings from the compartment 58 to the interior of the power station 10, etc.

In this manner the power station 10 can be fully assembled except for installation of the main power source 56 and closing the compartment 58 by installing the compartment door 60 with the fourth final screw set 88. In particular, all operations related to installation, connection, disconnection, replacement, upgrade, etc. of the main power source 56 are compartmentalized.

The main power source 56 will typically be a 12 volt automotive type battery, but a one-use chemical power pack and fuel cells are potential alternates. The main power source 56 thus will necessarily require periodic access, and the power station 10 especially provides for and facilitates this in a manner that is easy and safe, and that does not require extensive disassembly (e.g., separating the front shell piece 16 and the back shell piece 18, and/or tampering with other wiring or any internal parts).

FIG. 10a shows a typical full or maximum size main power source 56 installed. One that will permit maximum capacity of the functions provided by the power station 10. In contrast, FIG. 10b shows a smaller size main power source 56 installed, with bridge bars 100 added. One that will provide a lesser capacity of the functions provided by the power station 10. Embodiments of the power station 10 thus can be manufactured with one size of compartment 58 and be provided to end users with a variety of function capacities.

Many benefits are provided by this arrangement. The power station 10 can be manufactured and distributed without a main power source 56 installed. Then the party providing the power station 10 (e.g., a wholesaler providing to a retailer, or a retailer selling to an end user) can install a main power source 56 of a size and type as desired. One core model of the power station 10 can be stocked yet a variety of models can be provided to end users. Additionally, since the main power source 56 can be installed later, a larger single production run may be made and stocked without concern about the main power source 56 aging (i.e., discharging, degrading, corroding, etc.). A stock of the core power stations 10 can be keep for long periods, with fresh new main power sources 56 procured and installed only just before sale or use.

Another set of benefits peripherally relates to upgradability. A person can purchase a power station 10 with one type or size of the main power source 56 and easily change to another type or size of main power source 56 later. For instance, such a purchaser may be enticed by a lower price for a power station 10 that has a main power source 56 of the size (small) shown in FIG. 10b, but then find that they use the power station 10 enough that they want the larger main power source 56 shown in FIG. 10a. Or such a purchaser may obtain a power station 10 that has a main power source 56 that is a one-use chemical power pack, say, intending use only in an emergency, but find that they use their power station 10 enough that they want to install (upgrade to) a rechargeable 12 volt automotive type battery. Or a purchaser may obtain a power station 10 that has no optional modules (e.g., an air compressor module, power inverter module, high intensity lighting module, etc.) and then later purchase such a module and then also replace the original main power source 56 to one with a different type or size.

Another set of benefits relates to safety, both actual and perceived. As noted above in the discussion of FIG. 9, the main power source 56 cannot be installed incorrectly. It cannot be installed with the electrical polarity reversed, which might damage the power station 10 itself or which could damage other equipment or injure a user. Thus, wholesalers, retailers, and end users can all handle the power station 10 safely and with confidence. The wholesalers and retailers can rest assured that any end user with the basic intelligence to avoid directly shorting two power terminals together should be able to safely handle maintenance and upgrade of the power station 10 with regard to the main power source 56. And the end users can rest assured that their investment in the power station 10 can be long term and upgradeable, and that they themselves can perform maintenance and upgrades economically and safely.

Continuing with FIGS. 10a-b, and summarizing, a key point of novelty in the power station 10 that permits its benefits is the modular and compartmentalized reduction of power routing between the main power source 56 and the rest of the power station 10 to simply two connection points 102. This subtle aspect distinguishes the power station 10 over devices. Rather than have a hodge-podge of serial, parallel, and series-parallel wiring, forming a "rats-nest" that most end users would not dare to stick their hands into, the power station 10 keeps complexity in modules and has only minimal necessary complexity there. The compartmentalization of the main power source 56 is safe and minimally intimidating and the modularization of the overall power station 10 permits fast diagnosis and easy repair if any part of the power station 10 ever requires such.

FIGS. 11a-b are front and rear views, respectively, of an option module for use with the power station 10, here an air compressor module 104. The air compressor module 104 is able to provide adequate pressure and volumetric capacity to inflate flat tires, inflatable boats, etc., or to provide pressurized air for many other uses. The air compressor module 104 here has an on/off switch 106, a pressure gauge 108, an air hose 112 with a nozzle 114, and an accessory compartment 116. The rear view (FIG. 11b) particularly shows power wires 118 from the air compressor module 104 that will be connected to the power station 10 as wires 98 at the attachment posts 68.

Of course, other optional modules may be constructed for use with the power station 10. For example, the inventor is building a power inverter module to provide 120 and/or 240 volt alternating current (AC) that can be used to power many low to medium power AC devices, such as radios, televisions, hand power tools, etc. Another optional module might be a high intensity lighting module. Whereas the lighting panel 28 in most embodiments of the power station 10 is expected to provide 10-100 lumens of illumination, which is more than adequate for most tasks, an optional high intensity lighting module might provide 200-800 lumens and could additionally have a semi-rigid cable arm (sometimes termed a "goose neck" feature) that can be bend, wrapped, aimed, etc. as desired and to retain its position.

FIG. 12 shows how option modules are connected to the power station 10, in essence, they are "piggy-backed" onto the back shell piece 18 of the housing 14. The drawing, like FIGS. 5 and 8, have so far shown the compartment door 60 in the back shell piece 18 as being plain, but the present inventor actually envisions that few instances of the power station 10 will have a plain compartment door 60. Rather, it is expected that most instances of the power station 10 will be sold with an option module that uses the modified compartment door 60a in FIG. 12. As can be seen in FIG. 11, the modified compartment door 60a includes support and mounting holes for the air compressor module 104 and a hole 120 to permit the power wires 118 to be passed into the compartment 58 of the power station 10 and connected there to the attachment posts 68.

FIG. 13 is a stylized and basic schematic diagram of an electrical diagram for circuitry suitable for use in the inventive power station 10. The functions 12, 12a-12d, main power source 56, controls and features 40-48, and particularly the wires 98, 98a-b are shown. The modular nature of the power station 10 is stylistically emphasized here by how the wires 98, 98a-b connect at the two connection points 102. As has been discussed herein, the use of only the two simple connection points 102 is more than just a coincidental matter. This promotes ease in manufacturing and repair, and particularly simplifies and increases safety in end user servicing.

While various embodiments have been described above, it should be understood that they have been presented by way of example only, and that the breadth and scope of the invention should not be limited by any of the above described exemplary embodiments, but should instead be defined only in accordance with the following claims and their equivalents.

What is claimed is:

1. A power station (10) suitable for portable use by a human user, comprising:

a current source (12a,24) having a positive polarity conductor (98a) and a negative polarity conductor (98b);

a light source (12b,28) having a positive polarity conductor and a negative polarity conductor;

a voltage source (12c,36,38) having a positive polarity conductor and a negative polarity conductor;

a control panel (26) that includes controls (48,46) to permit the user to selectively operate said current source and said light source of the power station; and a housing (14) containing said current source, said light source, said voltage source, and said control panel, and suitable to contain a main power source (56) having a positionally fixed positive power terminal (92a) and a positionally fixed negative power terminal (92b);

said housing having a positionally fixed positive attachment post (68a) to which said positive polarity conductors of said current source, said light source, and said voltage source are electrically connected, and which is suitable for electrically connection of said positive power terminal of a said main power source;

said housing further having a positionally fixed negative attachment post (68b) to which said negative polarity conductors of said current source, said light source, and said voltage source are electrically connected, and which is suitable for electrically connection of said negative power terminal of a said main power source.

2. The power station (10) of claim 1 containing an installed said main power source (56).

3. The power station (10) of claim 1, wherein said current source (12a,24) includes a positive cable clamp (24a) and a negative cable clamp (24b).

4. The power station (10) of claim 3, wherein said housing (14) includes a pair of wing tabs to which one each of said positive cable clamp and said negative cable clamp can be clamped when the power station is not being used.

5. The power station (10) of claim 1, wherein said light source (12b,28) includes a plurality of LEDs (54).

6. The power station (10) of claim 1, wherein said voltage source (12c,36,38) includes a female automotive accessory type plug (36).

7. The power station (10) of claim 1, wherein said voltage source (12c,36,38) includes a universal serial bus (USB) type plug (38) to provide direct current power in accord with conventional USB standards.

8. The power station (10) of claim 7, wherein said USB type plug is a female USB type-A plug.

9. The power station (10) of claim 1, wherein said housing (14) includes a handle (20), a front shell piece (16), and a back shell piece (18).

10. The power station (10) of claim 9, wherein said back shell piece (18) includes a compartment door (60) to permit access to an installed said main power source (56).

11. The power station (10) of claim 1, wherein said main power source (56) includes an automotive industry type battery.

12. The power station (10) of claim 11, wherein said housing (14) has a housing shape and said battery (56) has a battery shape such that said battery cannot be operate ably installed into said housing with incorrect polarity.

13. The power station (10) of claim 12, wherein said positive power terminal (92a) of said battery (56) is suitable for direct physical and electrical connection to said positive attachment post (68a) and negative power terminal (92b) of said battery is suitable for direct physical and electrical connection to said negative attachment post (68b).

14. The power station (10) of claim 1, wherein said positive attachment post (68a) and said negative attachment post (68b) have non-linear shape wherein ends of said attachment post (68a) are closer together than if said attachment post (68a) had linear shape.

15. The power station (10) of claim 1, wherein said control panel (26) includes a charge gauge (40) and a charge check control (42) to permit the user to selectively operate said charge gauge.

16. The power station (10) of claim 1, wherein said control panel (26) includes a charging port (44) to permit attachment of an external charger to recharge an installed said main power source.

17. The power station (10) of claim 1, wherein said controls (48,46) that permit the user to selectively operate said current source (12a,24) and said light source (12b,28) are respectively a lighting button (46) and a main power switch (48).

18. The power station (10) of claim 1, further comprising an option source (12d) attaching an option module to the exterior of the power station.

19. The power station (10) of claim 18, wherein said housing (14) includes a back shell piece (18) that includes a compartment door (60a), and wherein said compartment door permits mounting and attachment of said option module.

\* \* \* \* \*